United States Patent
Howard et al.

(10) Patent No.: US 7,007,119 B2
(45) Date of Patent: Feb. 28, 2006

(54) SYSTEM AND METHOD FOR SUPPORTING SPLIT TRANSACTIONS ON A BUS

(75) Inventors: John S. Howard, Portland, OR (US); John L. Garney, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 495 days.

(21) Appl. No.: 09/967,775

(22) Filed: Sep. 28, 2001

(65) Prior Publication Data

US 2003/0065839 A1    Apr. 3, 2003

(51) Int. Cl.
*G06F 13/00* (2006.01)

(52) U.S. Cl. .............. 710/100; 710/267; 710/268; 710/269; 718/108; 345/545; 345/540; 345/951

(58) Field of Classification Search .............. 710/100, 710/267, 268, 269; 718/108
See application file for complete search history.

(56) References Cited

U.S. PATENT DOCUMENTS

| | | | | |
|---|---|---|---|---|
| 4,525,800 A | * | 6/1985 | Hamerla ........................ | 714/6 |
| 5,535,397 A | * | 7/1996 | Durante et al. ............. | 710/267 |
| 6,067,589 A | * | 5/2000 | Mamata ....................... | 710/63 |
| 6,086,430 A | * | 7/2000 | Amoni et al. ................ | 439/680 |
| 6,101,550 A | * | 8/2000 | Zucker ........................ | 709/241 |
| 6,119,190 A | * | 9/2000 | Garney ........................ | 710/310 |
| 6,216,183 B1 | * | 4/2001 | Rawlins ....................... | 710/100 |
| 6,247,091 B1 | * | 6/2001 | Lovett ......................... | 710/260 |
| 6,363,473 B1 | * | 3/2002 | Volentine et al. ........... | 712/202 |
| 6,408,325 B1 | * | 6/2002 | Shaylor ....................... | 718/108 |
| 6,493,781 B1 | * | 12/2002 | Saville et al. ............... | 710/260 |
| 6,505,267 B1 | * | 1/2003 | Luke et al. .................. | 710/315 |
| 6,606,674 B1 | * | 8/2003 | Howard ....................... | 710/100 |
| 6,625,761 B1 | * | 9/2003 | Sartore et al. ............... | 714/43 |
| 6,742,076 B1 | * | 5/2004 | Wang et al. ................. | 710/314 |
| 6,772,266 B1 | * | 8/2004 | Nalawadi ..................... | 710/305 |
| 2001/0013079 A1 | * | 8/2001 | Luke et al. .................. | 710/129 |
| 2001/0056513 A1 | * | 12/2001 | Ueda ........................... | 710/100 |
| 2002/0144033 A1 | * | 10/2002 | Ragland ...................... | 710/63 |
| 2003/0005259 A1 | * | 1/2003 | Nalawadi et al. ............ | 712/1 |
| 2003/0005272 A1 | * | 1/2003 | Nalawadi et al. ............ | 713/1 |
| 2003/0061424 A1 | * | 3/2003 | Leete et al. ................. | 710/260 |

OTHER PUBLICATIONS

"Enhanced Host Controller Interface Specifications for Universal Serial Bus," Jun. 20, 2001, Intel, Rev. . 96, pp. 2-6.*

(Continued)

*Primary Examiner*—Glenn A. Auve
*Assistant Examiner*—Donna K. Mason
(74) *Attorney, Agent, or Firm*—Blakely, Sokoloff, Taylor & Zafman LLP

(57) ABSTRACT

System and method for supporting split transactions on a bus. The method may comprise processing a periodic frame list of external bus data frame by frame, and traversing each frame node by node. When a save place node is encountered in a first frame, the traversing jumps to a destination node pointed to by the save place node in a second frame, and continues the traversing there. When a restore place node is encountered when traversing the nodes in the second frame, the traversing returns to the node after the save place node in the first frame and continues the processing in the first frame. The method may be implemented on a system that comprises a processor, a memory, an internal bus, and an external bus controller. The external bus controller and the external bus data may support one or more versions of the Universal Serial Bus standard.

15 Claims, 11 Drawing Sheets

OTHER PUBLICATIONS

Rhodes, David L., et al., "Overhead Effects in Real-Time Preemptive Schedules," May 3-5, 1999, ACM, Proceedings of the Seventh International Workshop on Hardware/Software Codesign, p. 193-197.*

"What is a Computer?—A Word Definition from the Webopedia Computer Dictionary," Jan. 4, 2002, available at www.webopedia.com.*

"What is a Host?—A Word Definition from the Webopedia Computer Dictionary," Apr. 28, 1997, available at www.webopedia.com.*

"What is a Computer System?—A Word Definition from the Webopedia Computer Dictionary," Oct. 31, 2001, available at www.webopedia.com.*

Universal Serial Bus Specification, Compaq-Intel-Microsoft-NEC, Rev. 1.1, Sep. 23, 1998, pp. i-xvi, 1-311.

Universal Serial Bus Specification, Compaq-HP-Intel-Lucent-Microsoft-NEC-Phillips, Rev. 2.0, Apr. 27, 2000, pp. i-xxviii, 1-622.

Howard, John S., et al., Enhanced Host Controller Interface Specification for Universal Serial Bus, Rev. 0.96, Jun. 20, 2001, pp. i-iv, 1-145.

* cited by examiner

SYSTEM AND METHOD FOR SUPPORTING SPLIT TRANSACTIONS ON A BUS

FIELD OF THE INVENTION

This invention relates to computers and computing devices that include a bus controller for an external bus such as the Universal Serial Bus (USB), and more particularly to providing support in the bus controller for improved throughput on the external bus when supporting devices which adhere to both newer and older versions of the external bus protocol.

BACKGROUND

As personal computers have evolved, the processing power and available memory have both increased with each passing year. However, to allow for continuing use of existing software applications and hardware devices, current computers must take into consideration limitations inherent in earlier computer models and earlier external devices so as to provide compatibility. This is sometimes referred to as legacy support, support for legacy systems, support for legacy devices, etc.

An external bus supported by many current personal computers is the Universal Serial Bus (USB). Version 1.1 of the USB standard provides for low speed communication at 1.5 Mbps and full speed communication at 12 Mbps. For more information see *Universal Serial Bus Specification*, Revision 1.1 dated Sep. 23, 1998 available from USB Implementers Forum, Inc. of Portland, Oreg. A newer version of the USB standard, version 2.0, provides for high speed communication at 480 Mbps., as well as providing support for low and full speed communication. For more information see *Universal Serial Bus Specification*, Revision 2.0 dated Apr. 27, 2000 available from USB Implementers Forum, Inc. of Portland, Oreg. Because many existing external USB enabled devices such as digital cameras, printers, etc., adhere to the USB 1.1 standard, USB 2.0 takes this into consideration and allows for USB 1.1 devices to be used with USB 2.0 host controllers and hubs.

To accomplish the improvement in speed over USB 1.1, USB 2.0 defines micro-frames of 125 microseconds such that eight micro-frames comprise the 1 millisecond frames described in the USB 1.1 standard. As each frame includes several micro-frames under USB 2.0, each frame may contain several transactions. For isochronous and other kinds of periodic transfers which initiate from a USB 1.1 device, multiple transactions may be split and may be included in micro-frames in each of a plurality of successive frames. It is up to the USB 2.0 host controller and hub controller implementation to support split transactions.

BRIEF DESCRIPTION OF THE DRAWINGS

The invention described herein is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

DETAILED DESCRIPTION

The Universal Serial Bus (USB) is an ever-popular external bus standard that may be often used for connecting external devices to personal computing devices such as personal computers. The USB 1.1 standard provides for low speed communication at 1.5 Mbps and full speed communication at 12 Mbps, while the USB 2.0 standard provides for high speed communication at 480 Mbps., while also supporting low and full speed communication. These two standards will be referred to as USB 1.1 and USB 2.0 respectively, and collectively as the USB standards. Although USB 2.0 provides for splitting or staggering USB 1.0 transactions across multiple frames, no implementation of how to manage and store USB data is provided in the USB standards. However, the Enhanced Host Controller Interface Specification for Universal Serial Bus, revision 0.96 dated Jun. 20, 2001 available from Intel Corporation of Santa Clara, CA. (the EHCI Specification) provides a standard for the handling of USB data. The EHCI Specification discloses subject matter derived from the Applicants of the instant application. The various embodiments of the invention described herein provide a system and method for traversing USB data that includes the splitting of USB transactions over multiple frames in a manner which increases efficiency and throughput of communications between USB devices and a USB 2.0 host controller.

Figure 1:
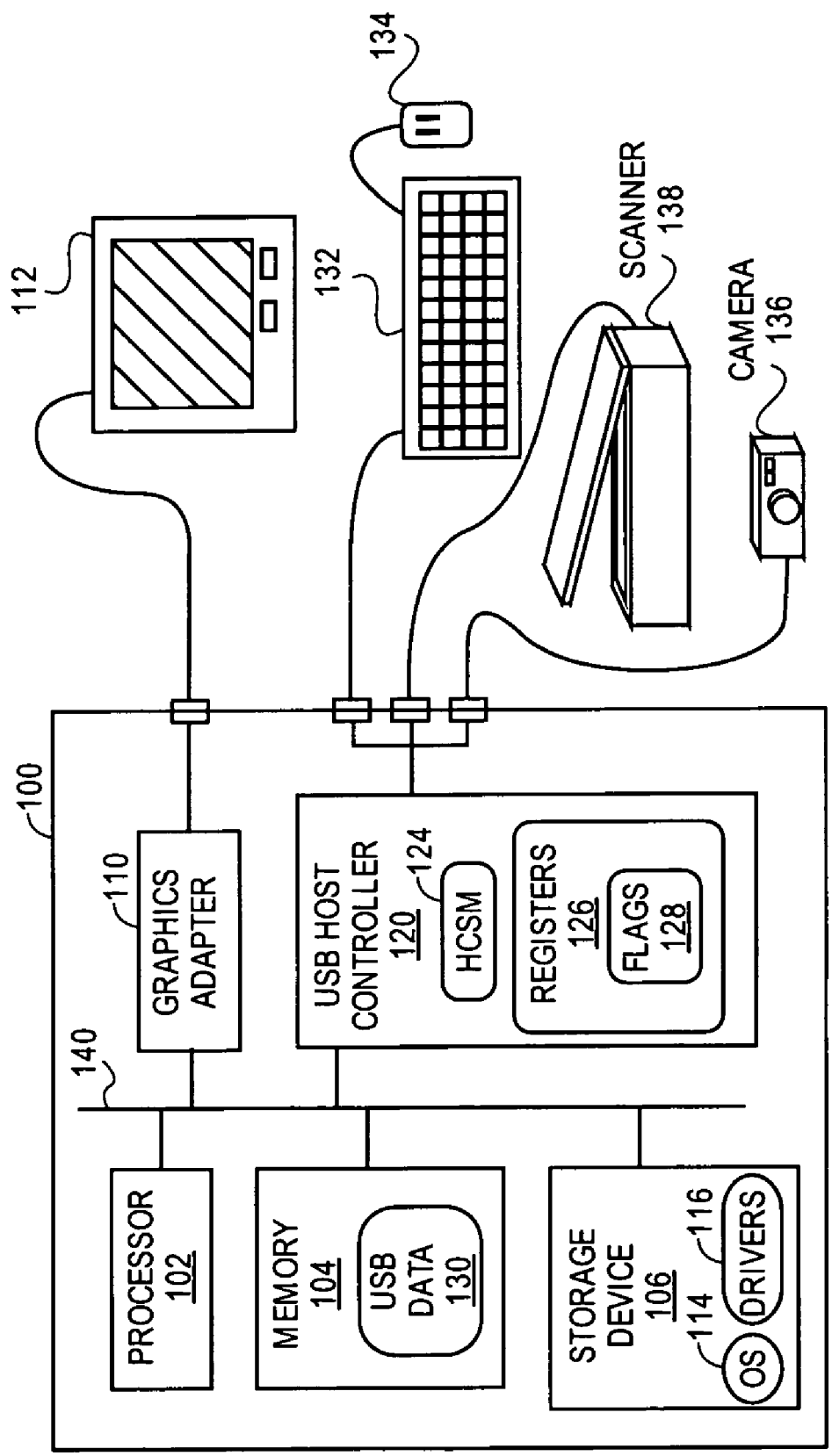
FIG. 1 illustrates a hardware environment in which one embodiment of the invention executes.

FIG. 1 illustrates a hardware environment in which one embodiment of the invention executes. A computing device such as personal computer 100 may include processor 102, memory 104, storage device 106, graphics adapter 110 and USB host controller 120 coupled with bus 140. Processor 102 may be any kind of processor and memory 104 may be any kind of random access memory (RAM). Personal computer 100 may include graphics adapter 110 that allows for the display of information such as text and graphics on display monitor 112.

In one embodiment, storage device 106 may be any kind of machine readable medium including, for example, magnetic media such as disk drives and magnetic tape; optical drives such as compact disk read only memory (CD-ROM) and readable and writeable compact disks (CD-RW); stick and card memory devices; read only memory (ROM), RAM, flash memory devices and the like; whether internal, such as storage device 106, directly coupled, accessible locally or accessible remotely via a network, via electrical, optical, acoustical or other form of propagated signals (e.g., carrier waves, infrared signals, digital signals, etc.) via a communications device (not shown). In one embodiment, operating system (OS) 114 and drivers 116 may be stored on storage device 106. Drivers 116 serve as the interface between operating system 114 and the various hardware components included in personal computer 100, including memory 104, graphics adapter 110 and USB host controller 120. For each hardware component included in personal computer 100, a driver for that component is stored on storage device 106.

Personal computer 100 may include a Universal Serial Bus (USB) host controller 120 which allows for two-way communication with external USB devices. Various USB enabled input devices may be coupled to personal computer 100 via USB controller 120, such as, for example, keyboard 132 and mouse 134. Other external devices which may be coupled to USB host controller 120 include, for example, camera 136, scanner 138, MP3 players, printers and additional USB enabled input devices such as a pen and tablet and a trackball. Although only one USB host controller is shown, multiple USB host controllers may be included in personal computer 100. In addition, each of the USB enabled devices may serve as a hub for other USB devices, and external hubs may be coupled to USB host controller 120.

In one embodiment, USB host controller 120 includes a state machine which manages the traversal of USB data stored as USB data 130 in memory 104 by a USB driver. This state machine may be referred to as host controller state machine (HCSM) 124. The hardware of USB host controller 120 may also include registers 126 and flags 128. In one embodiment, the flags may be included in a flag register such that the flag register is one of the registers included in the USB host controller.

In the various embodiments of the system and method presented herein, the method may be implemented as HCSM 124 which resides in USB host controller 120. In another embodiment, the HCSM may be implemented as software which may be executed on a small processor included in host controller 120 (not shown). In this software embodiment, the software could be stored on storage device 106 and transferred to host controller 120 for execution thereon, or the software may be stored on a programmable read-only memory (PROM) or similar device included on host controller 120 (not shown).

During start-up of personal computer 100, a USB host controller driver (included in drivers 116) obtains access to a portion of memory 104 and uses it to store USB data 130. USB data 130 includes various data structures constructed according to an implementation supporting USB 2.0. HCSM 124 then manages the traversal of and processing of the data structures and data included in USB data 130.

Figure 2:
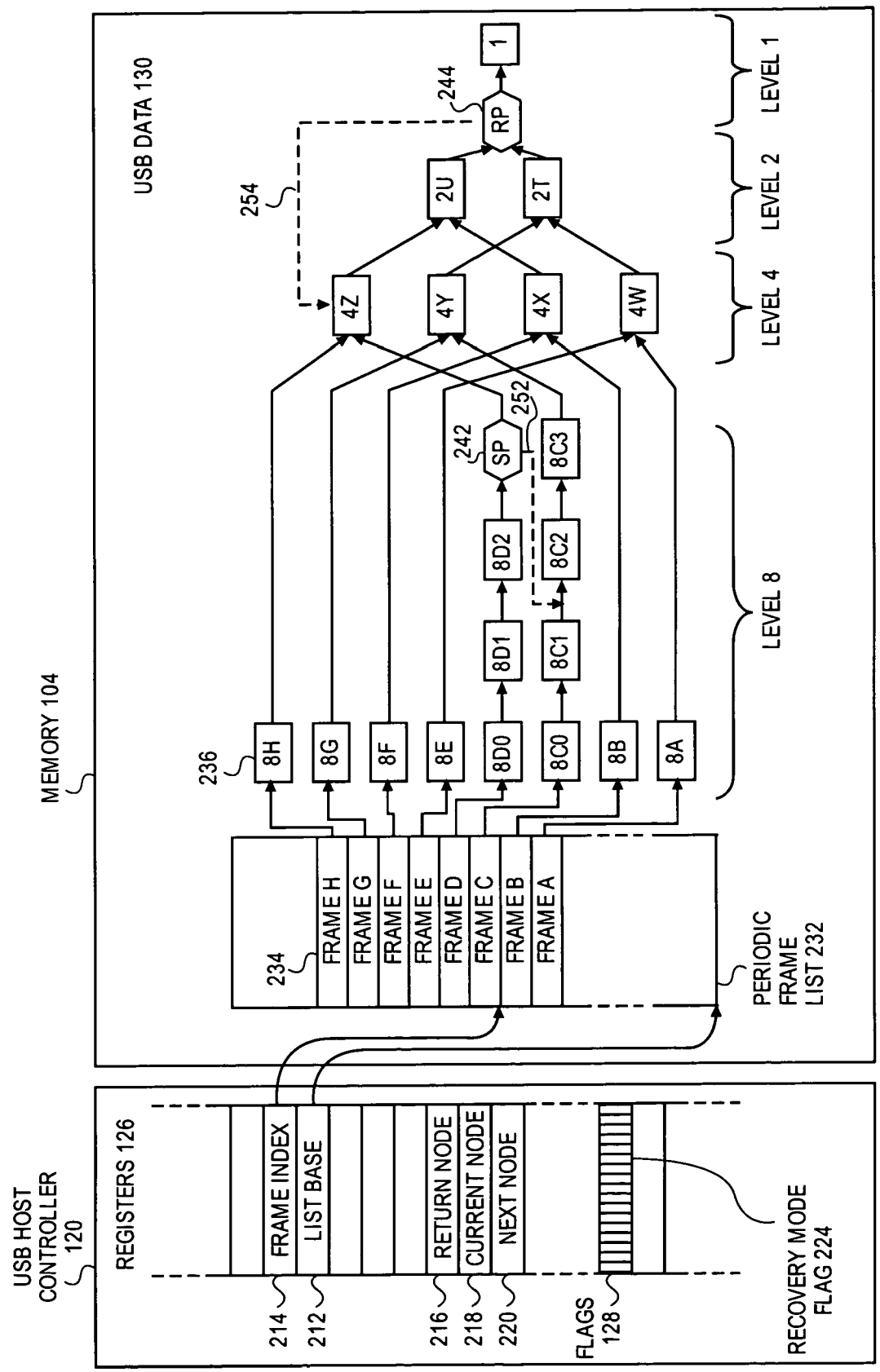
FIG. 2 illustrates a diagram of various data locations and data structures involved with an embodiment of the invention.

FIG. 2 illustrates a diagram of various data locations and data structures involved with an embodiment of the invention. In one embodiment, USB host controller 120 may include a plurality of registers 126. Registers 126 may include a frame list base address register 212 and a frame index register 214. Frame list base address register 212 may be used to store a frame list base address which may point to the location in memory 104 where a periodic frame list 232 of USB data 130 is located. The address of a current frame to be processed is designated as an offset known as frame index stored in frame index register 214. The registers may also include a return node address pointer register 216, a current node pointer register 218, a next node pointer register 220, and flags register 128. Among other flags, flags register 128 may include recovery mode flag 224. These registers and flags are discussed in more detail below.

In one embodiment, USB host controller 120 provides support for two categories of transfer types: asynchronous and periodic. Periodic transfer types include both isochronous and interrupt. Asynchronous transfer types include control and bulk. Accordingly, in one embodiment, USB host controller 120 provides separate schedules for each category of transfer type. Representatively, the periodic frame list 232 is a time-oriented frame listing representing a sliding window of time of USB host controller 120 work items. In one embodiment, all isochronous and interrupt transfers are serviced via a periodic schedule, such as, for example, periodic frame list 232. Conversely, all control and bulk transfers are serviced via an asynchronous schedule, such as synchronous schedule 270, as illustrated in FIG. 3.

Figure 3:
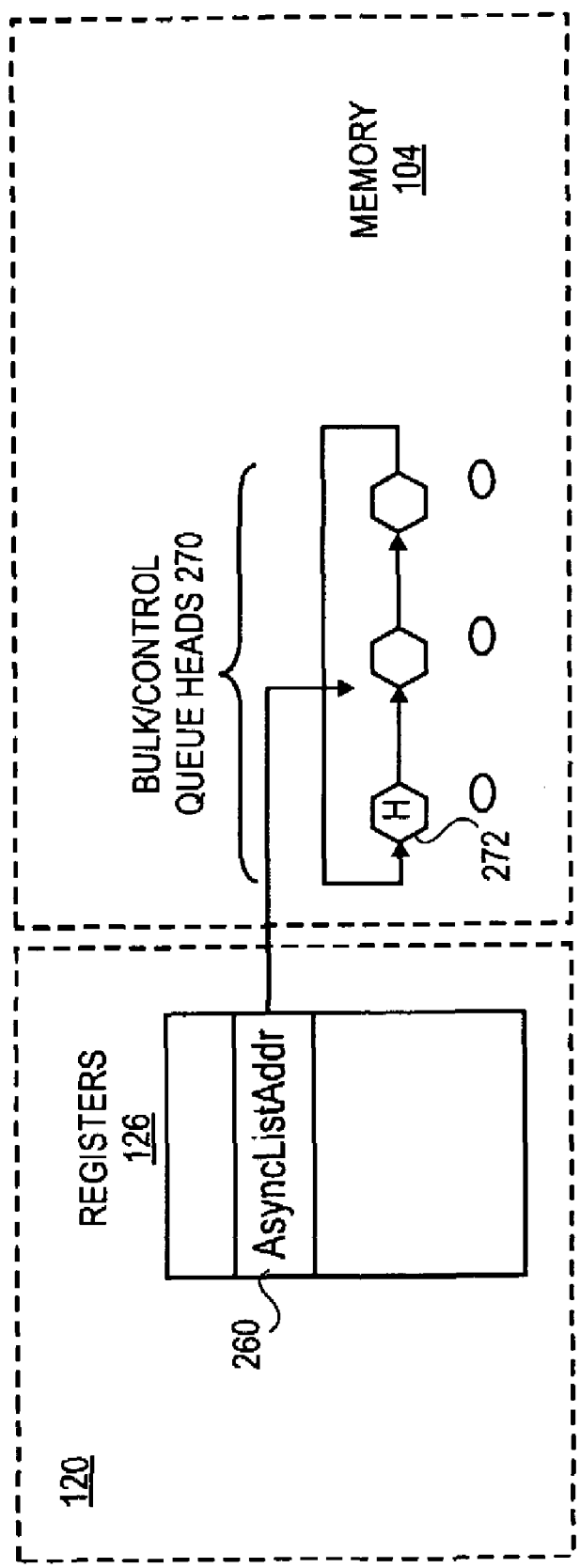
FIG. 3 is a block diagram illustrating an asynchronous schedule according to one embodiment of the invention.

FIG. 3 is a block diagram illustrating an asynchronous schedule 270, in accordance with one embodiment. Asynchronous schedule 270 is a simple circular list of scheduled work items that provide a round-robin service opportunity for all asynchronous transfers. In one embodiment, USB controller 120 uses the asynchronous schedule only when it reaches the end of the periodic list, the periodic list is disabled or the periodic list is empty. Representatively, the asynchronous schedule, or asynchronous transfer list, is a simple circular list of queue heads. The list address register 260 is simply a pointer to the next queue head. Accordingly, the asynchronous transfer list implements a pure round-robin service for all queue heads linked up to the asynchronous list.

Referring again to FIG. 2, the location in memory 104 of the current frame list head pointer of periodic frame list 232 is determined by combining the frame list base address with the frame index. In one embodiment, the periodic frame list is a 4 Kbyte page aligned array of frame list link pointers referred to as frame list head pointers 234. In one embodiment, each of the frame list link pointers is a 32 bit double word. In various embodiments, the periodic frame list may be of any desirable size, and the size of the periodic frame list may be programmable by driver 116 to any of the sizes supported by USB controller 120. In one embodiment, the periodic frame list may contain 1024 frame list link pointers. In other embodiments, the periodic frame list may contain 256, 512, etc. frame list link pointers.

Figure 4A:
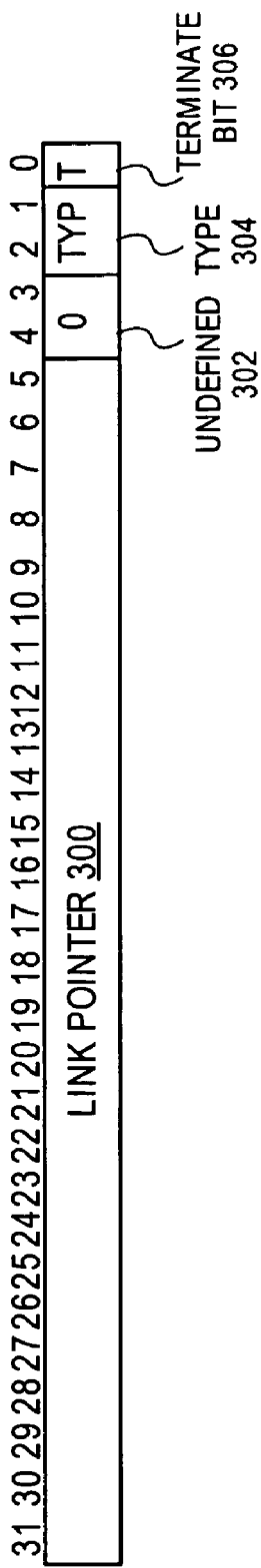
FIG. 4A illustrates a link pointer according to one embodiment of the invention.

FIG. 4A illustrates a link pointer according to one embodiment described herein. Each of the frame list head pointers 234 in periodic frame list 232 is a link pointer 300 that points to a linked list of data structures of various types. In one embodiment, the first field in each data structure, regardless of type, is a link pointer. In one embodiment, link pointers and frame list head pointers have the same defined format. In one embodiment, the format of these link pointers require that referenced data structures be aligned on specific byte boundaries, typically 32 bytes or greater. This alignment requirement leaves the least significant bits of link pointers 300 available for use other than address bits. In one embodiment, a type field 304 may be defined in bits 1 and 2 of a link pointer, and may be a value that represents the type of the next data structure. That is, the type of the data structure pointed to by the link pointer. The various types include transfer descriptors, queue heads, and frame span traversal nodes. In addition, bit 0 may be a terminate bit 306 that is set when the node is the last node in the particular frame. In one embodiment, bits 3 and 4 may be undefined 302. Each data structure, regardless of type, may be referred to as a node.

Referring again to FIG. 2, the frame list index register 214 is a counter that increments once per millisecond. The contents of frame list index register 214 may be referred to as a frame time. The host controller begins traversal of frame list 232 every 125 microseconds such that traversal begins every micro-frame. There are eight micro-frames in a frame. The result is that the host controller begins traversal of an offset into the frame list eight consecutive times before moving to the next frame list offset. The nodes 236 are linked from the frame list head pointers 234 according to the nearest power of two poll rate such that the longer poll rates appear before the shorter poll rates. Each node may be a transfer descriptor specifying transfer instructions or a transfer related task or a queue head pointing to a queue of transfer related tasks.

In order to achieve a poll rate of eight, a node must be linked relative to the frame list so that it is reachable from every eighth offset in the frame list. In order to achieve a poll rate of four, a node must be linked relative to the frame list so that it is reachable from every fourth offset in the frame list. Nodes linked at a specific poll rate may be referred to as level N, where N corresponds to the specific poll rate. For example, level 8, level 4, level 2 and level 1 nodes refer to poll rates 8, 4, 2 and 1, respectively. In this way, each level 8 node ($2^3$) must be accomplished eight times every eighth frame; each level 4 node ($2^2$) must be accomplished eight times every fourth frame; each level 2 node ($2^1$) must be accomplished eight times every other frame; and each level 1 node ($2^0$) must be accomplished every micro-frame. As such, the frame list may be viewed as a binary tree structure with the root being the level 1 node and the frame list head pointers being the leaves.

USB 1.1 defines a 1 millisecond frame, and USB 2.0 superimposes eight 125 microsecond micro-frames over the 1 millisecond USB 1.1 frame. In order to achieve maximum benefit from the 40 times faster signaling rate of high-speed devices added in USB 2.0, USB 2.0 defines a high-speed only host controller and external hubs which isolate the slower USB 1.1 device signaling rate from the high-speed signaling rate supported by USB 2.0 host controllers.

Figure 5:
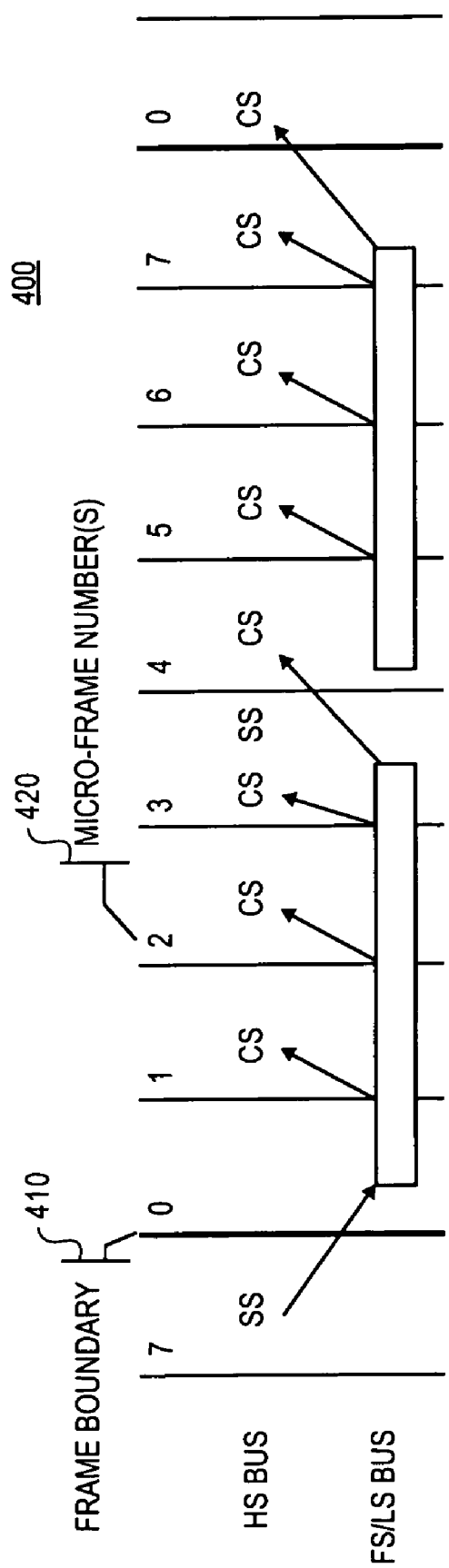
FIG. 5 is a block diagram illustrating a frame boundary relationship between a high-speed (HS) bus and a full-speed (FS)/low-speed (LS) (FSLS) bus, in accordance with one embodiment of the invention.

FIG. 5 is a block diagram illustrating a frame boundary relationship between a high-speed (HS) bus and a full-speed (FS)/low-speed (LS) (FS/LS) bus. in accordance with one embodiment of the invention. Representatively. USB 2.0 requires that the frame boundaries (SOF (start of frame) frame number changes) of the high-speed (HS) bus and the full-speed (FS) and low-speed (LS) (FSLIS) bus(s) below USB 2.0 Hubs be strictly aligned. Super-imposed on this requirement is that USB 2.0 Hubs manage full- and low-speed transactions via a micro-frame pipeline (see start- (SS) and complete- (CS) splits illustrated in FIG. 5). A simple, direct prolection of the frame boundary model into host controller 120 interface schedule architecture creates tension (complexity for both hardware and software) between the frame boundaries and the scheduling mechanisms required to service the full- and low-speed transaction translator periodic pipelines.

The simple proiection, as FIG. 5 illustrates, introduces frame-boundary wrap conditions for scheduling on both the beginning and end of a frame. In order to reduce the complexity for hardware and software, in one embodiment, host controller 120 is required to implement a one micro-frame phase shift for its view of frame boundaries. The phase shift eliminates the beginning of frame and frame-wrap scheduling boundary conditions.

Figure 6:
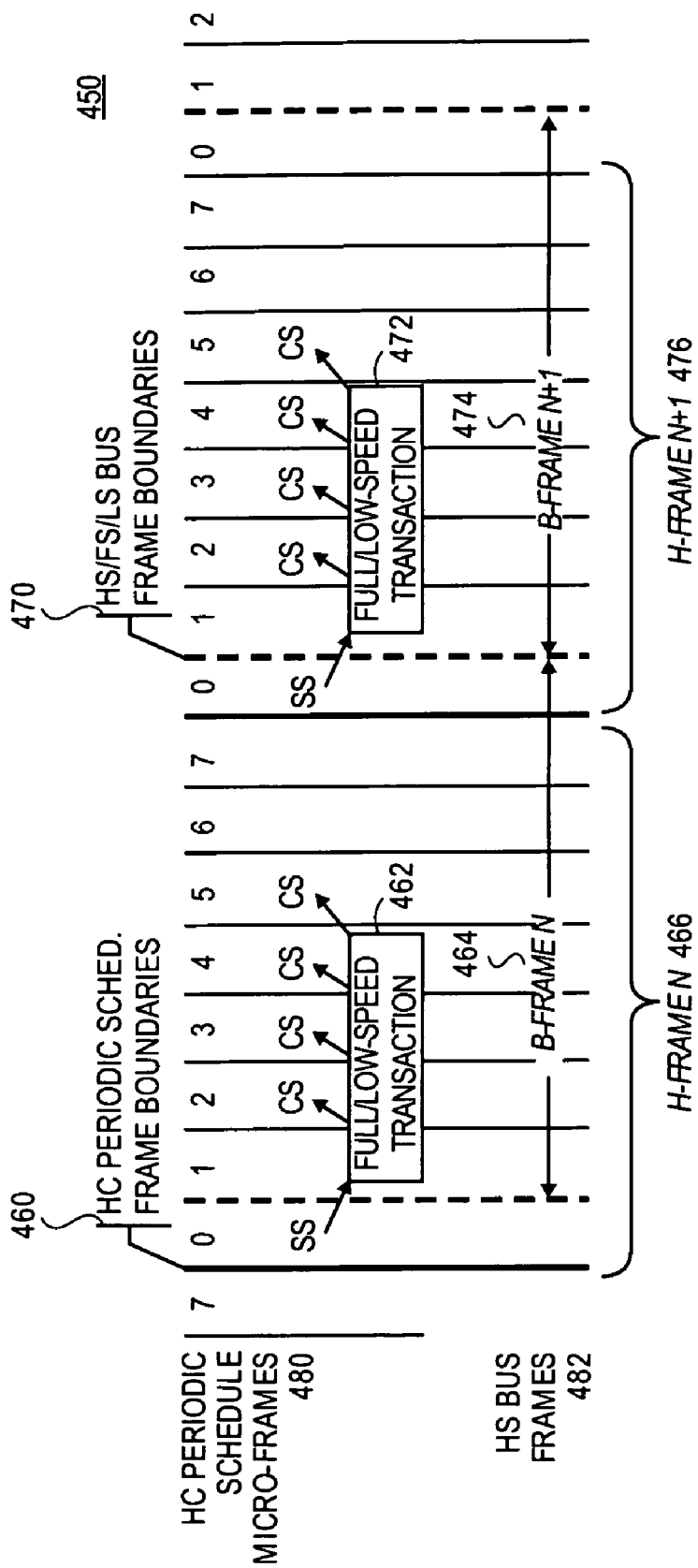
FIG. 6 is a block diagram illustrating the relationship of periodic schedule frame boundaries to bus frame boundaries, in accordance with one embodiment of the invention.

The implementation of this phase shift requires that host controller 120 use one register value for accessing the periodic frame list and another value for the frame number value included in the SOF token. These two values are separate, but tightly coupled. The periodic frame list 232 is accessed via Frame List Index Register (FRINDEX) 214 (FIG. 2). Bits FRINDEX [2:0], represent the micro-frame number. The SOF value is coupled to the value of FRINDEX [13:3]. Both FRINDEX [13:3]and the SOF value are incremented based on FRINDEX [2:0]. It is required that the SOF value be delayed from the FRINDEX value by one micro-frame. The one micro-frame delay yields host controller periodic schedule and bus frame boundary relationship as illustrated in FIG. 6. This adjustment allows software to trivially schedule the periodic start and complete-split transactions for full- and low-speed periodic endpoints, using the natural alignment of the period schedule interface.

FIG. 6 is a block diagram illustrating the relationship of periodic schedule frame boundaries to bus frame boundaries, in accordance with one embodiment of the invention. FIG. 6 illustrates how periodic schedule data structures relate to schedule frame boundaries and bus frame boundaries. To aid the presentation. two terms are defined. Host controller's 120 view of the 1-millisecond boundaries is called "H-Frames". The high-speed bus's view of the 1-millisecond boundaries is called "B-Frames".

H-Frame boundaries for host controller 120 correspond to increments of FRINDEX [13:3]. Micro-frame numbers for the H-Frame are tracked by FRINDEX [2:0]. B-Frame boundaries are visible on the high-speed bus via changes in the SOF token's frame number. Micro-frame numbers on the high-speed bus are only derived form the SOF token's frame number (i.e. the high-speed bus will see eight SOFs with the same frame number value). H-Frames and B-Frames have the fixed relationship (i.e. B-Frames lag H-Frames by one micro-frame time) illustrated in FIG. 6.

Host controller's 120 periodic schedule is naturally aligned to H-Frames. Software schedules transactions for full- and low-speed periodic endpoints relative the H-Frames. The result is these transactions execute on the high-speed bus at exactly the right time for the USE 2.0 Hub periodic pipeline.

Additionally, a split transaction protocol was added to the high-speed USE 2.0 domain. The split transaction protocol is used to forward a transaction via a hub to a full or low-speed device connected below the hub. The split transaction model is a two-phase model that allows a host to start a transaction on a USE 2.0 hub. The USB 2.0 hub will then execute the transaction to the full or low-speed device, and will retain the transaction results. The host controller will then extract the results of the full or low-speed transaction from the USB 2.0 hub during the completion phase of the split transaction. Full and low-speed periodic data streams are managed via a two-stage pipeline in USB 2.0 hubs. This means that it takes several micro-frames to complete a full or low-speed periodic transaction through a USB 2.0 hub. To achieve this, the host controller driver links data structures relative to the frame list so they are reachable at the appropriate poll rate. Based on this construction, common conditions exist where the start of a split transaction will begin in one frame and must complete in the next frame. Because the host controller driver creates a transaction stream with a device as a single data structure or node, in order to support split transactions that span a frame boundary, the node must be reachable from consecutive frame list locations.

Figure 4B:
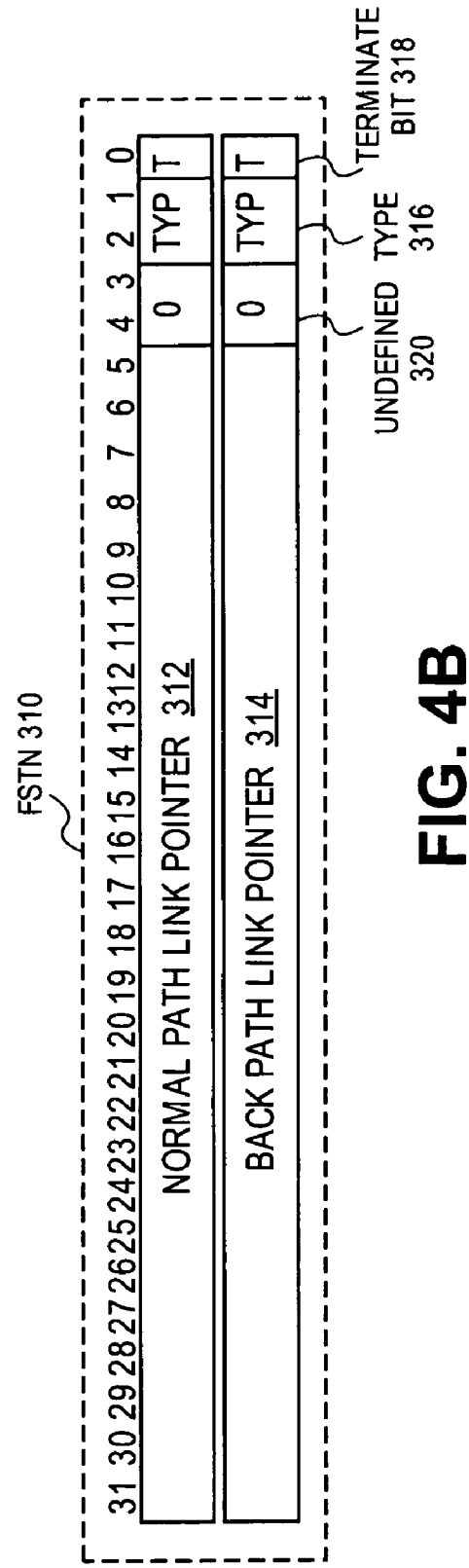
FIG. 4B illustrates a frame span traversal node according to one embodiment of the invention.

FIG. 4B illustrates an embodiment of a frame span traversal node according to one embodiment of the invention. FSTN 310 may comprise two 32 bit pointers, namely, a normal path link pointer 312 and a back path link pointer 314. Each of these pointers have, in one embodiment, the same format as link pointer 300 described above. In one embodiment, as with link pointer 300, the pointers 312 and 314 each may include an undefined field 320 in bits 3 and 4, a type field 316 in bits 1 and 2, and a terminate bit 318 at bit 0.

When the host controller traverses the nodes of a particular frame, a save place indicator may be encountered. When encountering a save place indicator, the host controller continues traversal at a location specified in the save place indicator's back path link pointer. For example, referring to FIG. 2, when save place indicator 242 is encountered, traversal shifts to transfer descriptor 8C2 as designated by the value in the save place indicator's back path link pointer and as shown by dashed line 252. In addition, when encountering a save place indicator, the host controller stores the save place indicator's normal path link pointer in return node register 216 and sets recovery mode flag 224. Traversal will then continue until a restore place indicator is reached. In one embodiment, when in recovery mode, that is, when the recovery mode flag is set to 1, only nodes that are active queue heads for full or low speed transfer are processed or otherwise executed. When restore place indicator 244 is reached, traversal continues at the location pointed to by the contents of return node register 216.

Figure 7:
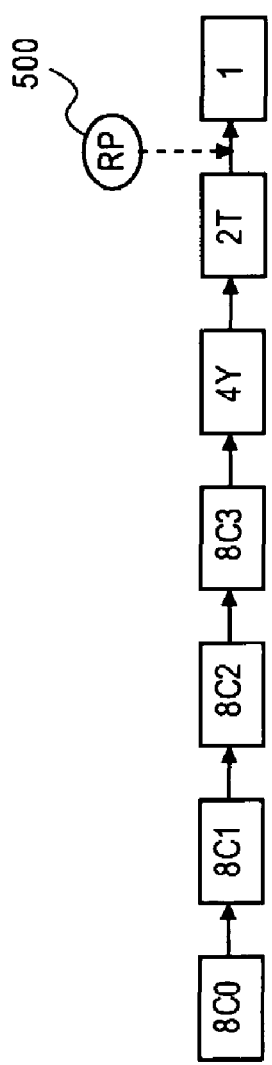
FIG. 7 illustrates an example sequence of nodes traversed during one frame according to an embodiment of the invention.

FIG. 7 illustrates an example sequence of nodes traversed during one frame according to an embodiment of the invention. When traversing the nodes of Frame C of periodic frame list 232 in FIG. 2, nodes 8C0, 8C1, 8C2, 8C3, 4Y, 2T, <RP>, and 1 are traversed, as shown in FIG. 7. During this traversal, restore place indicator 244 is ignored or passed over by the host controller as indicated by element 400 in FIG. 7. The restore place indicator is passed over because the recovery mode flag 224 has not been set because a save place indicator was not earlier encountered.

Figure 8:
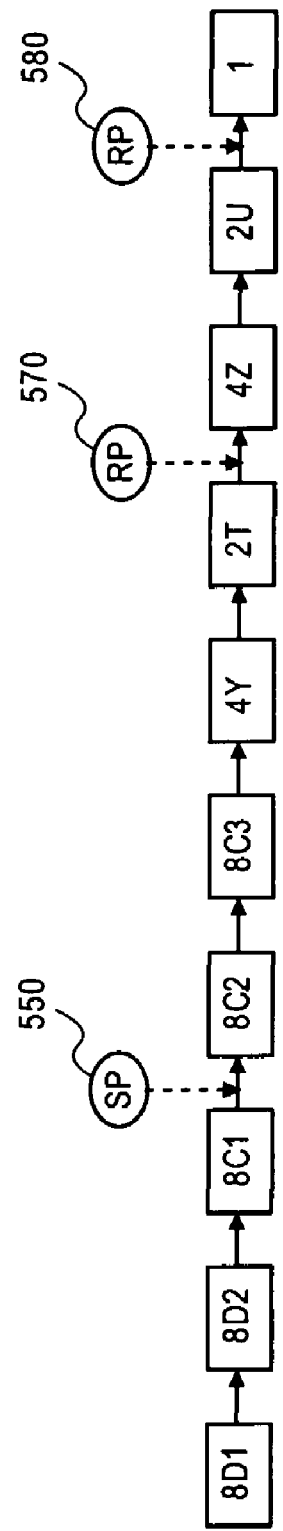
FIG. 8 illustrates an example sequence of nodes traversed during one frame according to an embodiment of the invention.

FIG. 8 illustrates an example sequence of nodes traversed during one frame according to an embodiment of the invention. When traversing the nodes of Frame D of periodic frame list 232 in FIG. 2, nodes 8D0, 8D1, 8D2, <SP>, 8C2, 8C3, 4Y, 2T, <RP>, 4Z, 2U, <RP>, and 1 are traversed, as shown in FIG. 8. During this traversal, save place indicator 242 of FIG. 2 is encountered as shown by element 510 of FIG. 8. This shifts traversal from node 8D2 of frame D to node 8C2 of frame C. Traversal continues until restore place indicator 244 of FIG. 2 is encountered, as shown by element 520 of FIG. 8. This shifts traversal from node 2T to node 4Z. Traversal continues from node 2U to node 1, such that when restore place path indicator 244 of FIG. 2 is encountered a second time, it is ignored, as shown by element 530 of FIG. 8.

Figure 9:
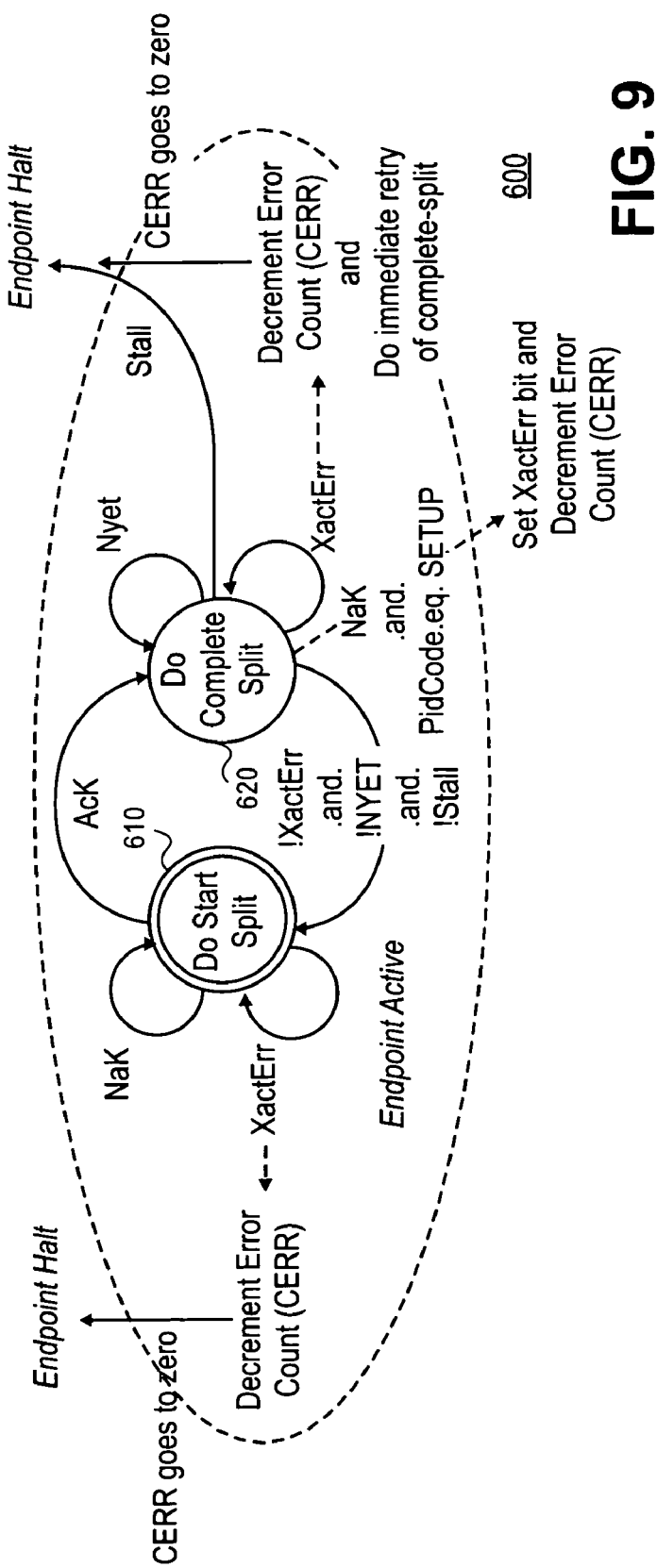
FIG. 9 is a block diagram illustrating a host controller asynchronous schedule split transaction state machine, in accordance with one embodiment of the invention.

In one embodiment, a queue head in the asynchronous schedule with an endpoint speed (EPS) field indicating a full-or low-speed device indicates to host controller 120 that it use split transactions to stream data for this queue head. All full-speed bulk and full-, low-speed control are managed via queue heads in the asynchronous schedule. Representatively. FIG. 9 illustrates a host controller asynchronous schedule split-transaction state machine, according to one embodiment.

In one embodiment, software initializes the queue head with the appropriate device address and port number for the transaction translator that is serving as the fulllow-speed host controller for the links connecting the endpoint. Software also initializes the split transaction state bit (SplitX-State) to Do-Start-Split. Finally, if the endpoint is a control endpoint, then system software sets the Control Transfer Type (C) bit in the queue head to a one. If this is not a control transfer type endpoint, the C bit is initialized by software to be a zero. This information is used by host controller 120 to properly set the Endpoint Type (ET) field in the split transaction bus token. When the C bit is a zero, the split transaction token's ET field is set to indicate a bulk endpoint. When the C bit is a one. the split transaction token's ET field is set to indicate a control endpoint.

In one embodiment, a do start split state is the state which software initializes a full- or low-speed asynchronous queue head. This state is entered from the Do Complete Split state only after a complete-split transaction receives a valid response from the transaction translator that is not a Next handshake.

For queue heads in this state, host controller 120 will execute a start-split transaction to the appropriate transaction translator. If the bus transaction completes without an error and a packet ID (PhD) code (PidCode) indicates an IN or OUT transaction. then host controller 120 reloads the error counter (CErr). If it is a successful bus transaction and the PidCode indicates a SETUP. host controller 120 will not reload the error counter. If the transaction translator responds with a Nak (negative acknowledgement). the queue head is left in this state. and host controller 120 proceeds to the next queue head in the asynchronous schedule.

If host controller 120 times out the transaction (no response, or bad response). host controller 120 decrements CErr and proceeds to the next queue head in the asynchronous schedule.

In one embodiment, the Do Complete Split state is the state entered from the Do Start Split state after a start-split transaction receives an Ack (positive acknowledgement) handshake from the transaction translator.

As illustrated in FIG. 9, the Do Complete Split state 120 for queue heads in this state, host controller 120 executes a complete-split transaction to the appropriate transaction translator. If the transaction translator responds with a Next handshake, the queue head is left in this state, the error counter is reset and host controller 120 proceeds to the next queue head in the asynchronous schedule. When a Next handshake is received for a bus transaction where the queue head's PidCode indicates an IN or OUT, host controller 120 will reload the error counter (CErr). When a Next handshake is received for a complete-split bus transaction where the queue head's PidCode indicates a SETUP, host controller 120 does not adjust the value of CErr.

Independent of PLDCode, the following responses have the effects:

Transaction Error (XactErr). Timeout or data cycle redundancy clock (CRC) failure, etc. The error counter (CErr) is decremented by one and the complete split transaction is immediately retried (if possible). If there is not enough time in the micro-frame to execute the retry, host controller 120 ensures that the next time host controller 120 begins executing from the Asynchronous schedule, it begins executing from this queue head. If another start-split (for some other endpoint) is sent to the transaction translator before the complete-split is really completed, the transaction translator could dump the results (which were never delivered to the host). This is why the core specification states the retries must be immediate. A method to accomplish this behavior is to not advance the asynchronous schedule. When host controller 120 returns to the asynchronous schedule in the next micro-frame, the first transaction from the schedule will be the retry for this endpoint. If CErr went to zero, host controller 120 must halt the queue.

NAK. The target endpoint Nak'sd the full- or low-speed transaction. The state of the transfer is not advanced and the state is exited.

If the PidCode is a SETUP, then the Nak response is a protocol error. The XactErr status bit is set to a one and the CErr field is decremented.

STALL. The target endpoint responded with a STALL handshake. Host controller 120 sets the halt bit in the status byte, retires the qTD but does not attempt to advance the queue.

If the PidCode indicates an IN. then any of the following responses are expected:

DATA0/1. On reception of data. host controller 120 ensures the PID matches the expected data toggle and checks CRC. If the packet is good. host controller 120 will advance the state of the transfer, e.g. move the data pointer by the number of bytes received, decrement BytesToTransfer field by the number of bytes received, and toggle the dt bit. Host controller 120 will then exit this state.

If the data sequence PID does not match the expected, the data is ignored, the transfer state is not advanced and this state is exited.

If the PidCode indicates an OUT/SETUP, then any of the following responses are expected:

ACK. The target endpoint accepted the data, so host controller 120 advances the state of the transfer. The Current Offset field is incremented by Maximum Packet Length or Bytes to Transfer, whichever is less. The field Bytes to Transfer is decremented by the same amount and the data toggle bit (dt) is toggled. Host controller 120 will then exit this state.

Split-transaction Interrupt-IN/OUT endpoints are managed via the same data structures used for high-speed interrupt endpoints. They both co-exist in the periodic schedule. Queue head offers the set of features required for reliable data delivery, which is characteristic to interrupt transfer types. The split-transaction protocol is managed completely within this defined functional transfer framework. For example. for a high-speed endpoint, host controller 120 will visit a queue head, execute a high-speed transaction (if criteria are met) and advance the transfer state (or not) depending on the results of the entire transaction. For low- and full-speed endpoints. the details of the execution phase are different (i.e. takes more than one bus transaction to complete) but the remainder of the operations framework is intact.

Full- and low-speed Interrupt queue heads have an EPS field indicating full- or low-speed and have a non-zero S-mask field. Host controller 120 can detect this combination of parameters and assume the endpoint is a periodic endpoint. Low- and full-speed interrupt queue heads require the use of the split transaction protocol. Host controller 120 sets the Endpoint Type (ET) field in the split token to indicate the transaction is an interrupt. These transactions are managed through a transaction translator'ss periodic pipeline. Software should not set these fields to indicate the queue head is an interrupt unless the queue head is used in the periodic schedule.

Figure 10:
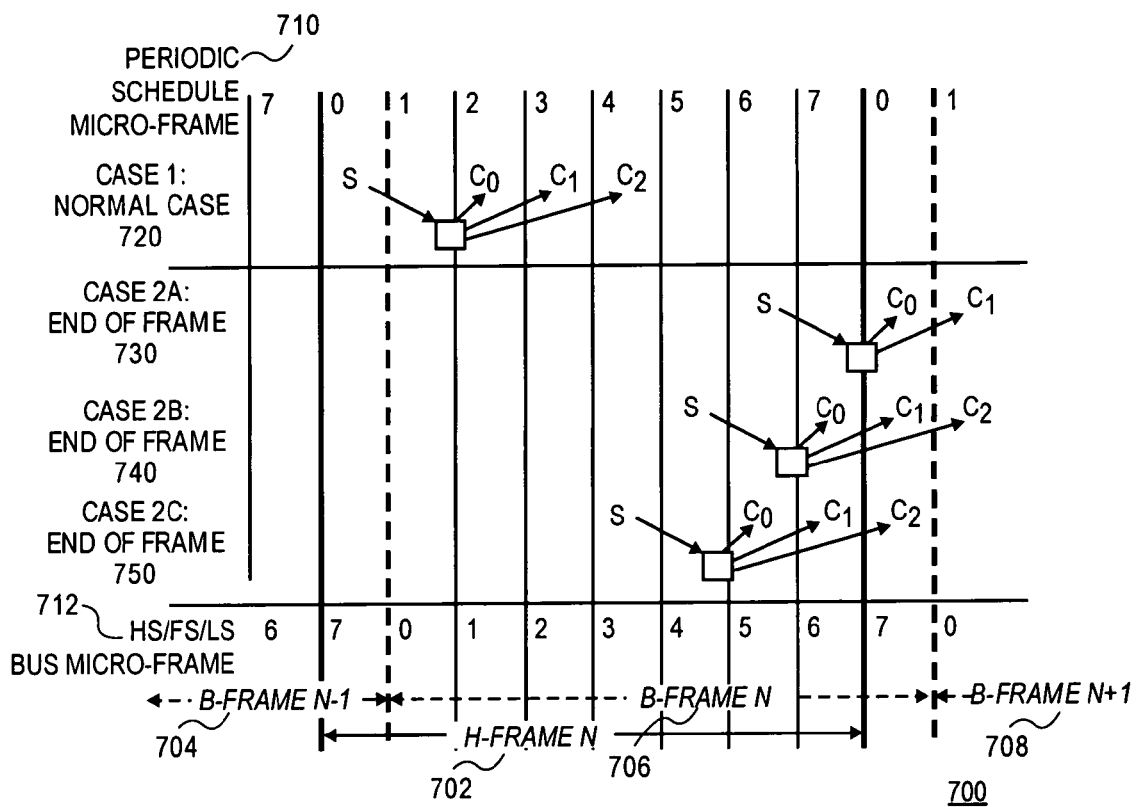
FIG. 10 is a block diagram illustrating interrupt schedule boundary conditions for split transactions, in accordance with one embodiment of the invention.

FIG. 10 is a block diagram illustrating interrupt schedule boundary conditions for split transactions. in accordance with one embodiment of the invention. System software manages the per/transaction translator periodic pipeline by budgeting and scheduling exactly during which micro-frames the start-splits and complete-splits for each endpoint will occur. The characteristics of the transaction translator are such that the high-speed transaction protocol executes during explicit micro-frames, or the data or response information in the pipeline is lost. FIG. 10 illustrates the general scheduling boundary conditions that are supported by the periodic schedule and queue head data structure. The S and $C_x$ labels indicate micro-frames where software can schedule start-splits and complete splits (respectively).

The scheduling cases are:

Case 1 (720): The normal scheduling case is where the entire split transaction is completely bounded by a frame (H-Frame in this case).

Case 2a through Case 2c (730–750): The USB 2.0 Hub pipeline rules states clearly, when and how many complete-splits must be scheduled to account for earliest to latest execution on the fullllow-speed link. The complete-splits may span the H-Frame boundary when the start-split is in micro-frame 4 (712) or later. When this occurs the H-Frame to B-Frame alignment requires that the queue head be reachable from consecutive periodic frame list locations.

The following queue head fields are initialized by system software to instruct host controller 120 when to execute portions of the split-transaction protocol.

SplitXState. This is a single bit residing in the Status field of a queue head. This bit is used to track the current state of the split transaction.

μFrame S-mask. This is a bit-field where-in system software sets a bit corresponding to the micro-frame (within an H-Frame) that host controller 120 should execute a start-split transaction. This is always qualified by the value of the SplitXState bit in the Status field of the queue head. For example, referring to FIG. 10. case one (720). the S-mask would have a value of 00000001b indicating that if the queue head is traversed by host controller 120, and the SplitXState indicates Do-Start. and the current micro-frame as indicated by FRINDEX [2:0]is 0, then execute a start-split transaction.

μFrame C-mask. This is a bit-field where system software sets one or more bits corresponding to the micro-frames (within an H-Frame) that host controller 120 should execute complete-split transactions. The interpretation of this field is always qualified by the value of the SplitXState bit in the Status field of the queue head. For example, referring to FIG. 10, case one, the C-mask would have a value of 00011100b indicating that if the queue head is traversed by host controller 120, and the SplitXState indicates Do Complete, and the current micro-frame as indicated by FRINDEX [2:0]is 2, 3, or 4, then execute a complete-split transaction.

It is software's responsibility to ensure that the translation between H-Frames and B-Frames is correctly performed when setting bits in S-mask and C-mask.

When host controller 120 encounters an FSTN during micro-frames 2 through 7 it simply follows the node's Normal Path Link Pointer to access the next schedule data structure.

When host controller 120 encounters a Save-Place FSTN in micro-frames 0 or 1, it will save the value of the Normal Path Link Pointer and set an internal flag indicating that it is executing in Recovery Path mode. Recovery Path mode modifies host controller's 120 rules for how it traverses the schedule and limits which data structures will be considered for execution of bus transactions. Host controller 120 continues executing in Recovery Path mode until it encounters a Restore FSTN or it determines that it has reached the end of the micro-frame (see details in the list below). The rules for schedule traversal and limited execution while in Recovery Path mode are:

- Always follow the Normal Path Link Pointer when it encounters an FSTN that is a Save-Place indicator. Host controller 120 must not recursively follow Save-Place FSTNs. Therefore, while executing in Recovery Path mode, it must never follow an FSTN'ss Back Path Link Pointer.
- Simply follow its Next Link Pointer.
- Do not process a QH (Queue Head) whose EPS field indicates a high-speed device. Simply follow its Horizontal Link Pointer.
- When a QH'ss EPS field indicates a FullILow-speed device, host controller 120 will only consider it for execution if its SplitXState is DoComplete (note: this applies whether the PID Code indicates an IN or an OUT).
- Stop traversing the recovery path when it encounters an FSTN that is a Restore indicator. Host controller 120 unconditionally uses the saved value of the Save-Place FSTN's Normal Path Link Pointer when returning to the normal path traversal. Host controller 120 must clear the context of executing a Recovery Path when it restores schedule traversal to the Save Place FSTN'ss Normal Path Link Pointer.
- If host controller 120 determines that there is not enough time left in the micro-frame to complete processing of the periodic schedule. it abandons traversal of the recovery path. and clears the context of executing a recovery path. The result is that at the start of the next consecutive micro-frame. host controller 120 starts traversal at the frame list.

Figure 11:
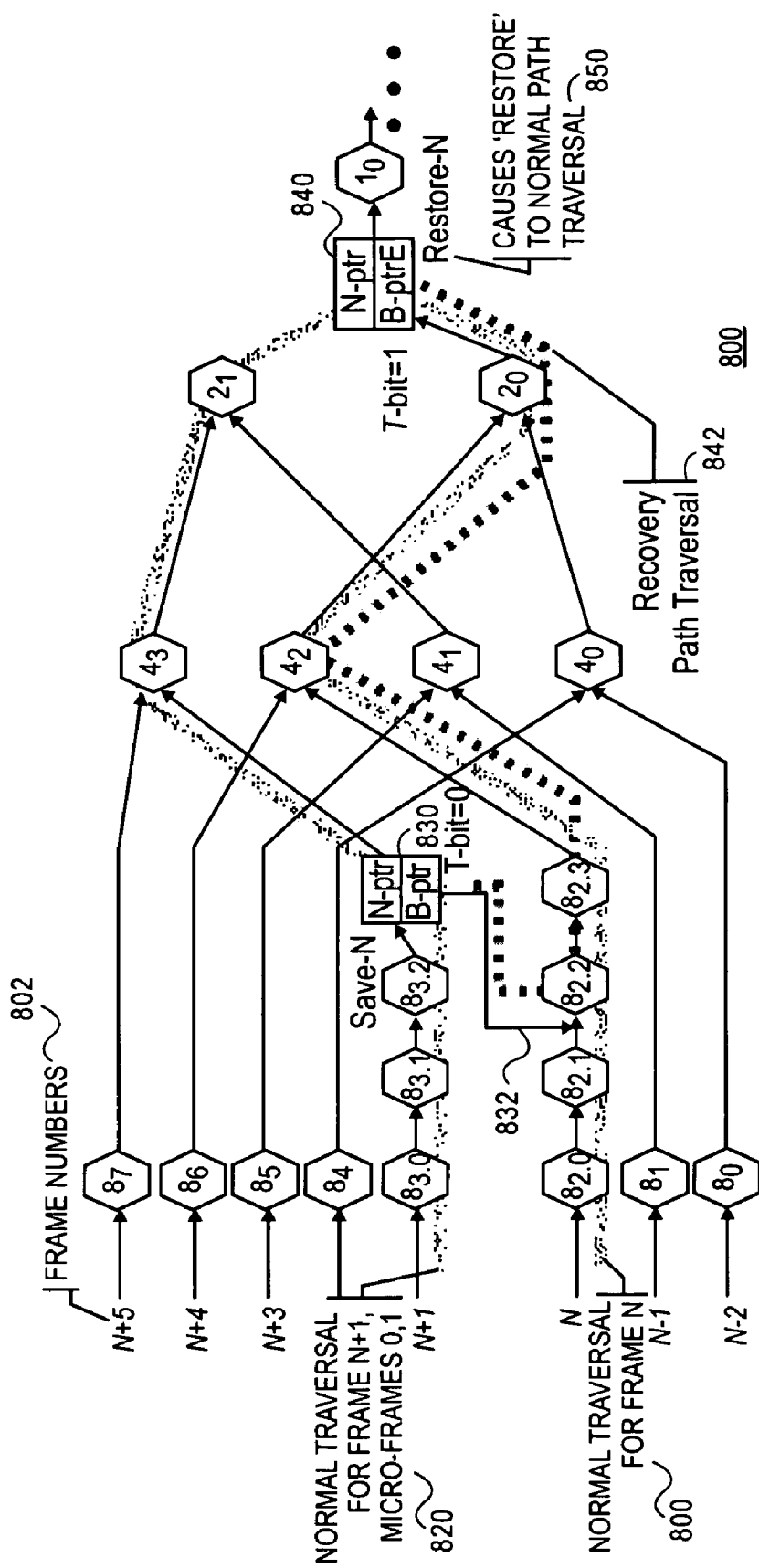
FIG. 11 is a block diagram illustrating a host controller traversal of a recovery path via frame span traversal nodes (FSTNs), in accordance with one embodiment of the invention.

FIG. 11 is a block diagram illustrating a host controller traversal of a recovery path via frame span traversal nodes (FSTNs). in accordance with one embodiment of the invention. In frame N (micro-frames 0–7). for this example. host controller 120 traverses all of the schedule data structures utilizing the Normal Path Link Pointers in any FSTNs it encounters. This is because host controller 120 has not yet encountered a Save-Place FSTN so it is not executing in Recovery Path mode. When it encounters the Restore FSTN 840. (Restore-N). during micro- frames 0 and 1. it uses Restore-N.Normal Path Link Pointer 850 to traverse to the next data structure (i.e. normal schedule transversal). This is because host controller 120 uses a Restore FSTN'ss Normal Path Link Pointer when not executing in a Recovery-Path mode. The nodes traversed during frame N include $\{8_{2,0}, 8_{2,1}, 8_{2,3}, 4_2, 2_0, \text{Restore-N}, 1_0 \ldots\}$.

In frame N+1 820 (micro-frames 0 and 1). when host controller 120 encounters Save-Path FSTN (Save-N). it observes that Save-N.Back Path Link Pointer.T-bit 830 is zero (definition of a Save-Path indicator). Host controller 120 saves the value of Save-N.Normal Path Link Pointer and follows Save-N.Back Path Link Pointer. At the same time. it sets an internal flag indicating that it is now in Recovery Path mode 832 (the recovery path is annotated in FIG. 11 with a large dashed line). Host controller 120 continues traversing data structures on the recovery path 832 and executing those bus transactions as noted above, on the recovery path unfil it reaches Restore FSTN 840 (Restore-N). Restore-N.Back Path Link Pointer.T-bit is set to a one (definition of a Restore indicator), so host controller 120 exits Recovery Path 850 mode by clearing the internal Recovery Path mode flag and commences (restores) schedule traversal using the save value of the Save-Place FSTN's Normal Path Link Pointer (e.g. Save-N.Normal Path Link Pointer). The nodes traversed during these micro-frames include: $\{8_{3,0}, 8_{3,1}, 8_{3,2}, \text{Save-A}, 8_{2,2}, 8_{2,3}, 4_2, 4_0, \text{Restore-N}, 4_3, 2_1, \text{Restore-N}, 1_0 \ldots\}$. The nodes on the recovery-path are bolded.

In frame N+1 (micro-frames 2–7), when host controller 120 encounters Save-Path FSTN Save-N, it will unconditionally follow Save-N.Normal Path Link Pointer. The nodes traversed during these micro-frames include: $\{8_{3,0}, 8_{3,1} 8_{3,2}, \text{Save-A } 4_3, 2_1, \text{Restore-N}, 1_0 \ldots\}$.

Figure 12:
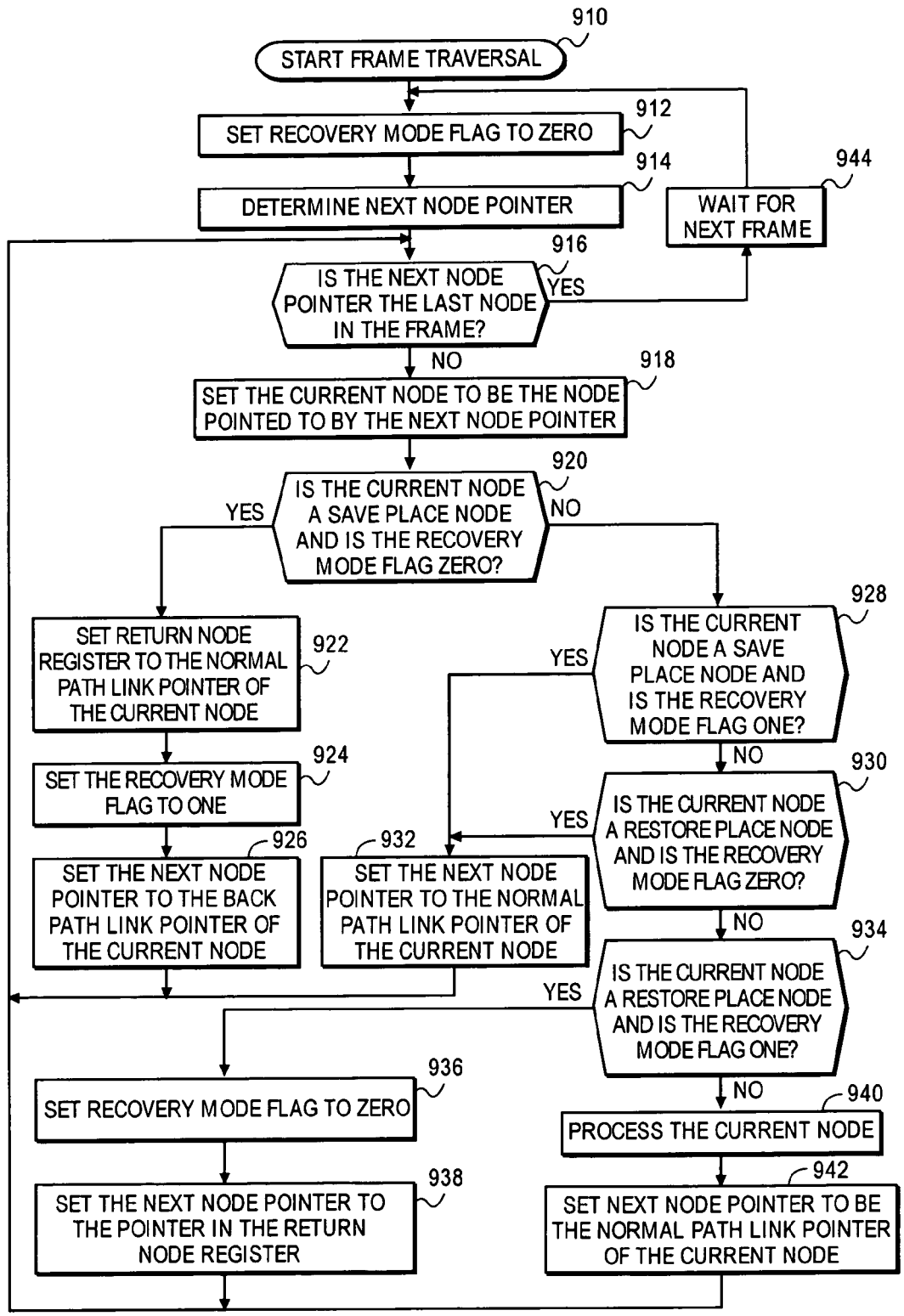
FIG. 12 illustrates a flow of actions taken pursuant to an embodiment of the invention.

FIG. 12 illustrates a flow of actions taken pursuant to an embodiment of the invention. In one embodiment, as discused above, the location of the periodic frame list is determined by combining the contents of the frame index register and the list base register. In one embodiment, the HCSM may use a current node pointer register and a next node pointer register in traversing and procesing a frame list. In another embodiment, local variables may be used. Frame traversal begins, as shown in block 910. The recovery mode flag is cleared, initialized to 0, indicating that the HCSM is not in recovery mode, as shown in block 912. The addres of the next node pointer is determined by combining the contents of the frame index register with the contents of the list base register as shown in block 914. A check is then made to determine if the next node pointer is the last node in the frame, as shown in block 916.

In one embodiment, this may be achieved by looking at the first bit of the next node link pointer, also known as the terminate bit. (See FIGS. 4A and 4B.) If the next node pointer does not point to the last node in the frame, the current node pointer is then set to be the node pointed to by the next node pointer, as shown in block 918. A check is then made to determine if the current node is a save place node and if the recovery mode flag is 0, as shown in block 920. If the recovery mode flag is 0 and the current node is a save place node, the HCSM sets the return node register to be the normal path link pointer of the current node, as shown in block 922. In this way, the return node register maintains a pointer to where traversal will continue when a restore place node is encountered. The recovery mode flag is then set to 1, as shown in block 924. The next node pointer is then set to the value of the back path link pointer of the current node, as shown in block 926. In this way, traversal continues at a node in the prior frame. The HCSM then continues execution at block 916.

If the current node is not a save place node or if the recovery mode flag is not 0, as shown in block 920 a check is then made to determine whether the current node is a save place node and if the recovery mode flag is set to 1, as shown in block 928. If the current node is a save place node and the HCSM is in recovery mode, as shown in block 928 the save place node is skipped over such that the HCSM sets the next node pointer to be the normal path link pointer of the current node, as shown in block 932. If either the current node is not a save place node or the recovery mode flag is not 1, as shown in block 928, a check is then made to determine whether the current node is a restore place node and the recovery mode flag is 0, as shown in block 930. If the current node is a restore place node and the recovery mode flag is set to 0, the restore place node is skipped over such that the HCSM sets the next node pointer to be the normal path link pointer of the current node, as shown in block 932. The HCSM then continues execution at block 916.

The HCSM then checks if the current node is a restore place node and the recovery mode flag is set to 1, as shown in block 934 If so the HCSM takes the recovery path. That is the HCSM sets the recovery mode flag to 0, as shown in block 936 and sets the next node pointer to the pointer in the return node register, as shown in block 938. In this way, the HCSM continues traversal at the node from which traversal was temporarily redirected, which is reachable from the next frame list location. The HCSM then continues execution at block 916.

If either the current node is not a restore place node or the recovery mode flag is not 1, as shown in block 934, the HCSM proceses the current node, as shown in block 940. In view of the earlier checks made by the HCSM, this node must be a "normal" node, that is, neither a save place nor a restore place node, such that the node can be procesed according to its type. The HCSM then sets the next node pointer to be the normal path link pointer of the current node, as shown in block 942. The HCSM then continues at block 916.

If when during traversal of the micro-frames of the current frame, the next node points to the last node in the frame, as shown in block 619, the HCSM transitions to the next frame by waiting for the next frame, as shown in block 944. The HCSM then continues at block 912 with procesing the next frame.

In the foregoing specification, the invention has been described with reference to specific embodiments thereof. It will, however, be evident that various modifications and changes can be made thereto without departing from the broader spirit and scope of the invention as set forth in the appended claims. The specification and drawings are, accordingly, to be regarded in an illustrative rather than a restrictive sense.

What is claimed is:

1. A method comprising:
    procesing a periodic frame list frame by frame, each frame including a list of nodes;
    traversing each frame node by node;
    when a save place node is encountered in a first frame, jumping to a destination node pointed to by the save place node, the destination node in a second frame, and continuing the traversing in the second frame at the destination node;
    when a restore place node is encountered in the second frame, returning to a node after the save place node in the first frame, and continuing the traversing in the first frame.

2. The method of claim 1 wherein the save place node and the restore place node are each frame spanning traversal nodes which comprise a back path link pointer and a normal path link pointer.

3. The method of claim 2 wherein jumping comprises:
    checking whether a recovery mode flag is set;
    if the recovery mode flag is not set, storing the back path link pointer of the save place node in a return node register, setting the recovery mode flag, and continuing the traversing at the node pointed to by the normal path link pointer of the save place node.

4. The method of claim 2 wherein returning comprises:
    checking whether a recovery mode flag is set;
    if the recovery mode flag is set, clearing the recovery mode flag and continuing the traversing at the node pointed to by a return node register.

5. A method comprising:
    procesing a plurality of external bus data including traversing a plurality of nodes in a frame of a plurality of frames in a periodic frame list;
    when a save place node is encountered,
    checking whether a recovery mode flag is set,
    if the recovery mode flag is set then continuing the traversing with a next node,
    if the recovery mode flag is not set then storing a back path link pointer of the save place node in a return node register, setting the recovery mode flag, and continuing the traversing at the node pointed to by a normal path link pointer of the save place node;
    when a restore place node is reached,
    checking whether the recovery mode flag is set,
    if the recovery mode flag is set then clearing the recovery mode flag and continuing the traversing at the node pointed to by the contents of the return node register,
    if the recovery mode flag is not set then continuing the traversing with the next node.

6. The method of claim 5 wherein the periodic frame list comprises a plurality of frame head pointers each pointing to a node list of some of the plurality of nodes.

7. The method of claim 6 wherein the nodes comprise a binary tree structure.

8. The method of claim 5 wherein the external bus data is information regarding at least one device adhering to a Universal Serial Bus standard.

9. A system comprising:
    a procesor and a memory coupled to an internal bus;
    an external bus controller coupled to the internal bus, the external bus controller having a plurality of registers including a return node addres register, and having a plurality of flags including a recovery mode flag;
    a state machine included with the external bus controller, the state machine to proces a plurality of external bus data in the memory by traversing a periodic frame list including a plurality of frames, each frame having a plurality of nodes, the periodic frame list including at least one save place node and at least one restore place node.

10. The system of claim 9 wherein the external bus controller provides support for a well known external bus standard.

11. The system of claim 10 wherein the well known external bus standard is the Universal Serial Bus ver 2.0 standard.

12. A machine readable medium having instructions stored thereon which when executed by a procesor cause the procesor to perform operations comprising:
    procesing a periodic frame list frame by frame, each frame including a list of nodes;
    traversing each frame node by node;
    when a save place node is reached in a first frame, jumping to a destination node pointed to by the save place node in a second frame and continuing the traversing in the second frame at the destination node;
    when a restore place node is reached in the second frame, returning to the node after the save place node in the first frame and continuing the traversing in the first frame.

13. The machine readable medium of claim 12 wherein the save place node and the restore place node are each frame spanning traversal nodes which comprise a back path link pointer and a normal path link pointer.

14. The machine readable medium of claim 13 wherein jumping comprises:
- checking whether a recovery mode flag is set;
- if the recovery mode flag is not set, storing the back path link pointer of the save place node in a return node register, setting the recovery mode flag, and continuing the traversing at the node pointed to by the normal path link pointer of the save place node.

15. The machine readable medium of claim 13 wherein returning comprises:
- checking whether a recovery mode flag is set;
- if the recovery mode flag is set, clearing the recovery mode flag and continuing the traversing at the node pointed to by a return node register.

* * * * *